Patented May 18, 1943

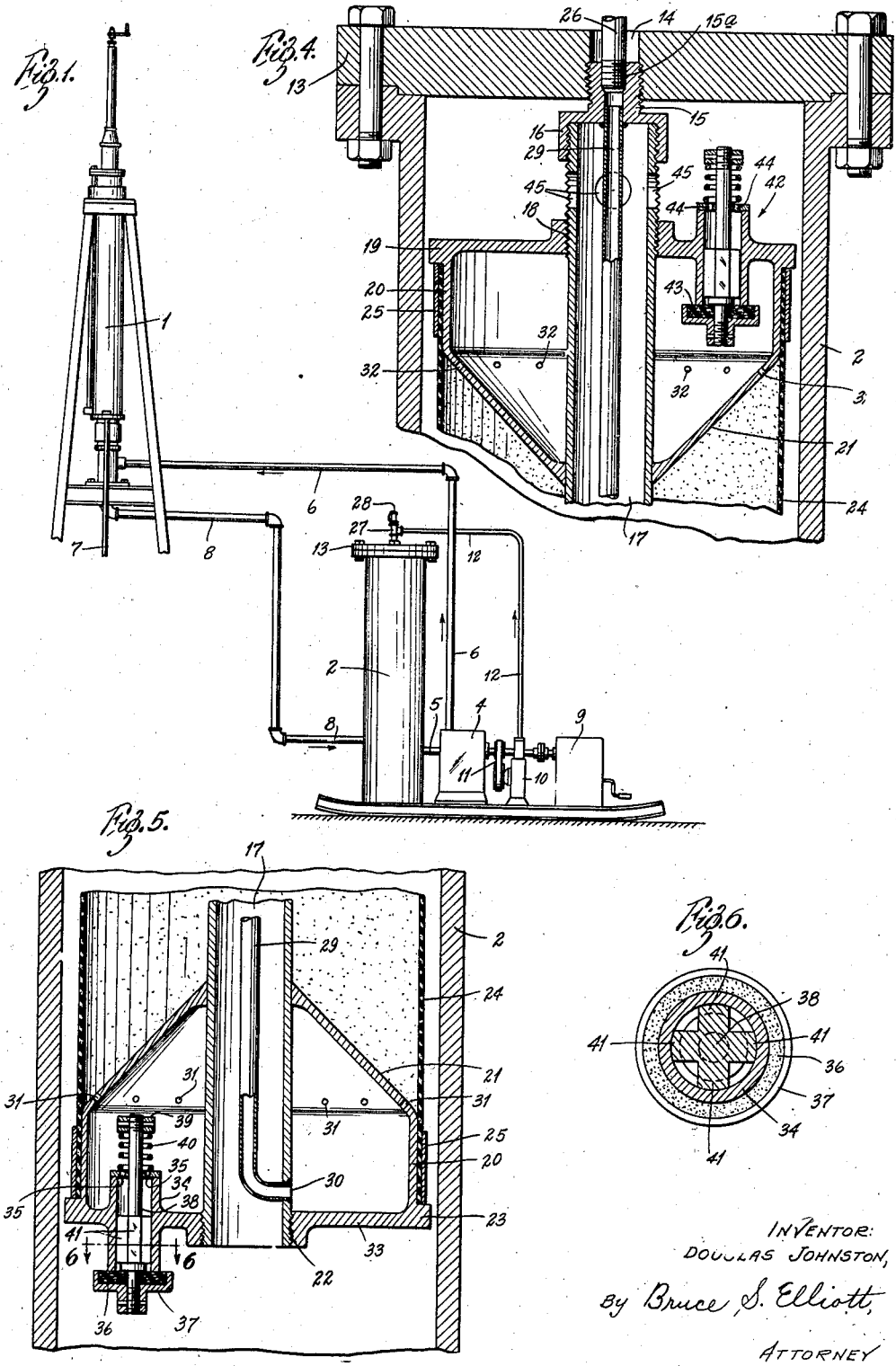

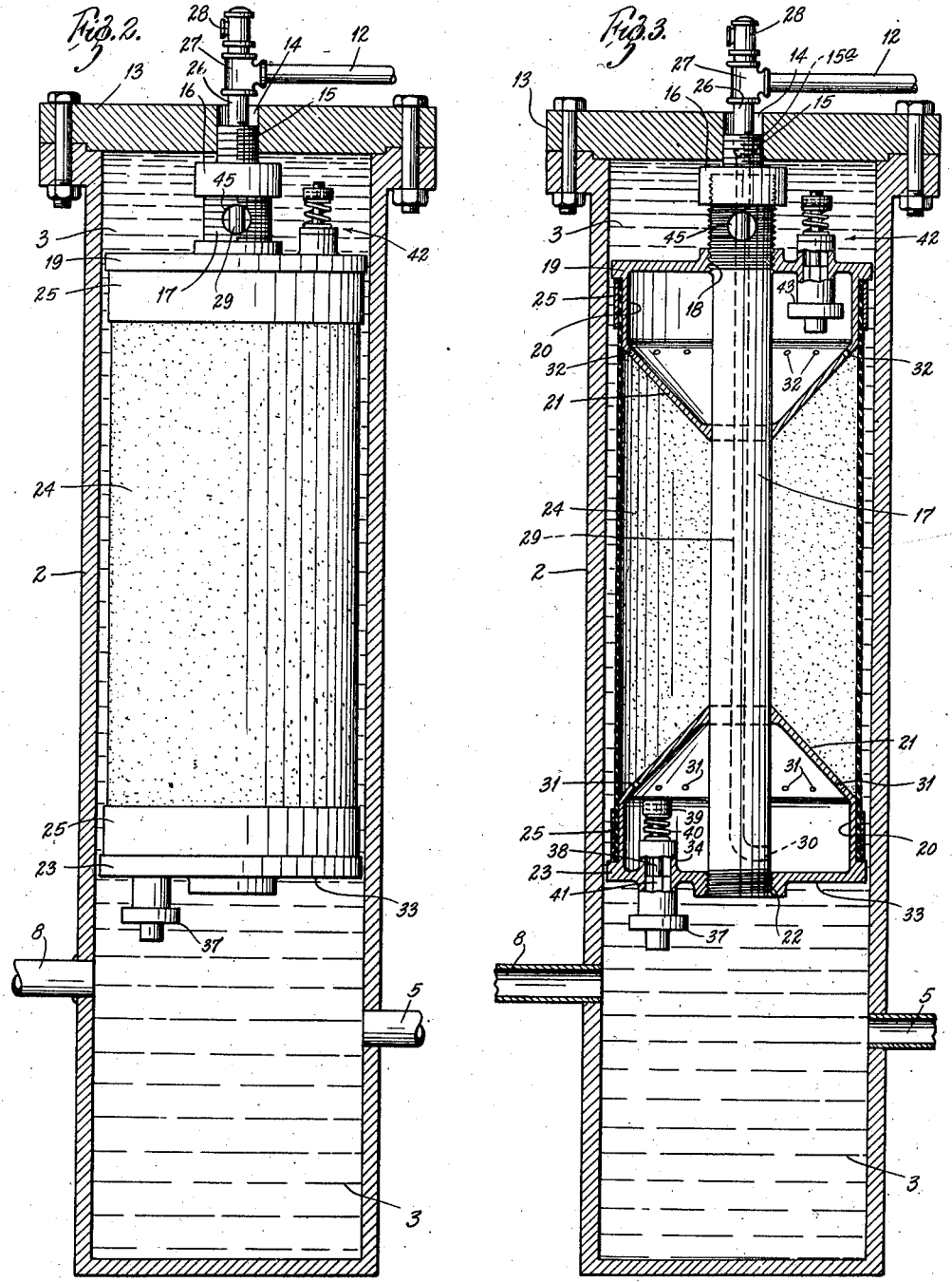

2,319,460

UNITED STATES PATENT OFFICE 2,319,460

BREATHER FOR FLUID-ACTUATED MACHINERY

Douglas Johnston, Shelbyville, Ill., assignor to Leslie R. Tallman, Gentry L. Tallman and Emma S. Tallman, all of Shelbyville, Ill., and Jesse L. Tallman, Decatur, Ill., trading as Tallman Manufacturing Company Application May 5, 1941, Serial No. 391,883

5 Claims. (Cl. 138—30)

This invention relates to improvements in hydraulic and hydro-pneumatic machinery and is applicable in use to such devices as hydraulic-pneumatic pump jacks for oil wells, hydro-pneumatic accumulators, machine tools, and, in fact to practically all types of fluid-actuated machinery.

Nearly all hydraulically operated machines that are in common use at the present time require a special oil for the hydraulic fluid. Among the more important properties the oil must possess are freedom from foaming, ability to quickly dispel entrained air bubbles, corrosion prevention properties, ability to counteract disadvantages of water that inevitably gets into the system, freedom from oxidation and decomposition, and a high flash point to prevent fires.

Oil discharging at high velocity into a reservoir, as it does from a rapidly moving piston, or cylinder, always causes a certain amount of foaming, and unless the reservoir is unduly large, in order to allow the air bubbles to separate out before reaching the suction inlet to the pump, the air will enter the pump, causing a reduction in volumetric efficiency, erratic operation of the cylinder, or the piston, according to the type of pump used, and possibly oxidation of the oil and corrosion in the cylinder, especially if there is water, or water vapor, present and the temperature of the oil is high.

In any hydraulic machine the oil reservoir must be provided with a vent unless the entire reservoir is maintained under a positive air pressure. This is necessary because the reservoir level varies with the forward and return strokes of the cylinder or piston. Air, continuously passing in and out of the reservoir, carries water vapor which invariably, during a period of weeks, condenses and deposits water in the oil, which eventually causes rusting and damage to the system. If the oil reservoir is maintained under air pressure, troubles due to oxidation, condensation, foaming, etc., are greatly magnified.

At present, hydraulic machines are being designed to transmit horsepowers of greater magnitude than formerly, and without excessively large reservoirs and frequent replacement of the oil, considerable difficulties have been encountered due to the reasons mentioned.

With these difficulties incident to the operation of hydraulic machinery in mind, it is the purpose of my invention to provide for the operation of fluid-actuated machines with hydraulic fluid, such as oil, which shall at all times be maintained out of contact with air, and this whether the oil in the reservoir is at atmospheric pressure, or is maintained under the pressure of air at all times. To this end, I locate within the tank, or reservoir, which is completely filled with oil, an expansible and contractible separator, or breather, which is in contact with the oil on one side and with the air on the other, and no contact between the air and oil through the breather being possible. The latter simply expands and contracts to accommodate volume changes in the tank. If the oil in the tank is at atmospheric pressure, when a portion of the oil is withdrawn for the hydraulic operation, the breather will simply be expanded within the tank to an extent sufficient to compensate for the amount of oil withdrawn. When this oil is again returned to the tank, the breather will gradually return to its normal position.

If the oil in the tank is to be held under pressure at all times, then the breather is exposed to the pressure of compressed air at all times which is of course transmitted to the oil in the tank. When oil is withdrawn from the tank, the breather will be expanded by the compressed air to compensate for volume change and maintain pressure on the oil. When oil is returned to the tank, the breather will contract against the pressure of the air to an extent necessary to accommodate the influx of the oil. The air is continually supplied to the breather by an air compressor, and a relief valve is employed in the air line to maintain the air pressure at a desired degree at all times. Thus my improved breather is not only suitable for operation at atmospheric pressure, as stated, but it is equally satisfactory for service where the reservoir is maintained under heavy air pressure, as in accumulators for hydraulic machinery. In the latter case, I preferably construct the breather by securing a length of elastic hose at opposite ends on heads mounted within the tank, and provide means for continuously supplying air under pressure to the interior of the hose. The latter is of smaller diameter than the tank, and will be completely surrounded by the oil therein so that in the alternate withdrawal of oil from, and its return to the tank, the breather hose will expand and contract, always maintaining the requisite pressure on the oil while compensating for volumetric changes in the tank, as has been described. This breather hose is made of neoprene, or some other suitable elastic material, that will not be attacked or deteriorated by the hydraulic fluid employed.

The invention is illustrated in the accompanying drawings, in which—

Figure 1 is an elevational view, partly broken away, illustrating a hydraulic pumping system for oil wells in which my invention is embodied;

Figure 2 is a vertical section, on an enlarged scale, of the oil supply tank having my novel breather mounted therein;

Figure 3 is a similar view, with the breather and its supports and connections shown in section;

Figure 4 is a broken sectional view on an enlarged scale of the upper portion of the tank and breather shown in Figure 3;

Figure 5 is a similar view of the lower portion of the same; and

Figure 6 is a sectional view taken on the line 6—6 of Figure 5 and viewed in the direction of the arrows.

Referring now to the drawings, the numeral 1 indicates a hydraulic pump arranged for pumping an oil well, and is of the type fully shown and described in my pending application Ser. No. 268,160, filed April 27, 1939. This particular pumping system is only shown to illustrate one application of the invention, and this particular pump need not be described in detail, as my invention is applicable, as I have before stated, to all types of fluid actuated machinery in the operation of which oil is alternately withdrawn from and returned to an oil supply tank or reservoir, usually in fairly rapid succession. The numeral 2 indicates such an oil-supply tank, which is maintained supplied with oil 3 to its full capacity at all times. The numeral 4 indicates an oil pump, of any conventional type, which in operation withdraws oil from the tank 2 through a pipe 5 located near the bottom of said tank and forces it through a pipe 6 into the hydraulic pump 1 for operating the same. In the particular hydraulic pump shown, the piston is stationary, and the cylinder reciprocates thereon, its lower end being connected by hangers 7 to the pump rod (not shown). Leading from the discharge of the pump 1 is a pipe 8 through which the discharged oil passes back into the tank 2 at a point somewhat higher than that at which oil is withdrawn through the pipe 5. The oil pump 4 is driven by a motor 9, which also operates an air pump 10 by means of a belt drive 11 from its shaft. Leading from the air pump 10 is a pipe 12 which serves to supply compressed air to my improved breather located within the tank 2, and which I will now describe.

The tank 2 is preferably circular in cross-section and is closed at its upper end by a bolted head 13, which is provided with a central opening 14 screw-threaded in its lower portion to receive the screw-threaded upper end of a boss 15 projecting from the central portion of a steel socket member 16, into which is screwed the upper end of a pipe 17, which extends downward in tank 2 to any desired distance, depending upon the size of the breather employed, but which in any event terminates some distance above the mouths of the pipes 5 and 8. Mounted on the pipe 17 near its upper end, preferably by being screwed thereon as indicated at 18, is a bell casting 19, having a cylindrical upper portion 20 and a conical lower portion 21, the bottom end of which snugly embraces the pipe 17, as shown. The pipe 17 is open at its lower end, and screwed thereon, as indicated at 22 is a bell casting 23, similar in shape and size to the bell casting 19, having the cylindrical portion 20 and conical portion 21. Mounted at opposite ends on the cylindrical portions 20 of the bell castings 19 and 23 is my improved breather 24, which is in the form of a thin hose of neoprene, or similar material which will not be attacked or deteriorated by the oil, or other hydraulic fluid, the breather being securely held in place on the bell castings at each end by suitable clamps 25 the connection being air-tight. The pipe 17 serves to maintain the bell castings 19 and 23 in fixed separated relation and holds them rigidly in place in order to prevent the thin hose 24 from rubbing the sides of the tank. The bell castings 19 and 23 and the pipe 17 are preferably made of a corrosion resisting metal, such as aluminum or bronze.

The boss 15 of the socket member 16, previously referred to, is tubular, and is tapped at its outer end, as indicated at 15a in Figs. 3 and 4, so that the air pressure line may be screwed into it from the outside. To this end, a short pipe section 26 is screwed at its lower end into an opening in the boss 15, and at its upper end is screwed into the bottom of a T-coupling 27. Secured in the side of this T-coupling is the upper end of the air line 12 leading from the compressor 10, previously referred to. Secured in the top of the T-coupling 27 is a relief valve 28, of conventional construction, which serves to keep the air pressure in the breather from rising above any predetermined value for which it is set. The compressed air from air line 12 enters the breather 24 through a tube 29, which is welded at its upper end in the lower end of the opening in boss 15, and at its lower end in an opening in the wall of the pipe 17 located near the lower end of the latter, as indicated at 30. The opening 30, or the lower end of tube 29, communicates with the interior of the bell casting 23, so that compressed air from said tube is discharged into said bell casting. The latter is provided in its conical portion 21 with a number of small holes 31, which allow the air to pass into the breather 24. The conical portion 21 of bell casting 19 is provided with similar small holes 32, the openings 31 and 32 allowing the air to surge in and out of the bell castings, as will be understood. If, due to accident, the oil line, or a connection, should burst, draining the oil from tank 2, the air under pressure in breather 24 would tend to burst it. Against this contingency, I provide the safety-valve arrangement now to be described.

Mounted on the bottom wall 33 of the bell casting 23, and preferably cast integral therewith, is a cylindrical valve casing 34, extending above and below the bottom wall, its upper end being located within the bell casting and being provided with air inlet openings 35, and its lower end being open and forming a seat for a neoprene washer 36 mounted in a cap 37. This cap is secured on the lower end of a valve stem 38, which extends upward through and beyond the top of valve casing 34, and carries at its upper end an adjusting nut 39. Surrounding the stem 38 and extending between this adjusting nut and the top of valve casing 34 is a coil spring 40, which is maintained by the adjusting nut under very light tension. Thus, in the event of a break in the oil line, permitting escape of oil from tank 2, valve 37 will open and release the air before the pressure differential becomes high enough to rupture the breather 24. The stem 38 is provided with fins 41 bearing against the wall of the casing 34, which act as guides to cause the stem to move in right lines, so that the washer 36 will always seat properly against the seat formed by the lower open end of said casing.

In a similar manner, I provide against damage to the breather apparatus should the air line burst. In this event, the oil might suddenly collapse the breather 24 against the bell castings 19 and 23 and pipe 17 and crush them. To provide against this danger, I provide a second safety valve, which is mounted on the bell casting 19. This valve is indicated, as a whole, by the numeral 42, and is identical in construction with the safety valve on the bell casting 23, except that its position is reversed. That is to say, the valve proper, 43, is located inside of the bell casting 19, and is held to its seat by the pressure of the air in the breather, whereas, in the case of the safety valve on bell casting 23, the valve proper 37 is located outside of the bell, and is normally held to its seat by the pressure of oil in tank 2. Also, in the case of valve 42, the openings 44 in the top of the valve casing allow oil to enter instead of air, as with the first safety valve. Now, in the event the air line should burst, allowing the breather hose 24 to collapse and release pressure on valve 43, the oil pressure will immediately open this valve and admit oil into the breather to equalize the pressure and prevent damage to the bells and pipe. The bell castings are designed hollow, as shown, to furnish spaces for the valves so that in case the hose 24 should collapse it will not be punctured by a valve.

As the oil volume flows into tank 2 through pipe 8 to contract the hose, or breather, 24, it flows up around the outside of the hose and up inside of the pipe 17 and out of holes 45 provided near the upper end of pipe 17. This allows the oil to flow toward the center of the hose from both directions and prevents excessive frictional drag on the hose from one direction, which might slide it off of a bell casting.

In operation, air under pressure inside of hose 24 transmits pressure to the oil in tank 2, the oil completely surrounding the hose at all times. In Figure 2, the hose is shown fully distended, the maximum amount of oil having been withdrawn from the tank by oil pump 4 and forced through pipe 6 to the hydraulic pump 1. As the oil begins to discharge from the hydraulic cylinder of this pump and starts flowing through pipe 8 into the tank, hose 24 begins to fold in, or contract, compressing the air inside to a slight extent. For the most satisfactory operation, breather 24 should be made of such volume that the fluid variation in and out of the tank is equal to about 1/20 the air volume of the breather. In such case, the air pressure does not vary greatly, and the hose is not flexed excessively and will last indefinitely.

It will be readily seen, therefore, that the air in the breather 24 will expand and compress to compensate for volumetric variations of oil in tank 2, causing the hose to expand as oil is withdrawn from the tank and to contract as oil is forced into the tank, and that the air cannot at any time come into contact with the oil. The automatic relief valve 28 prevents the air pressure in the breather hose from exceeding a desired maximum.

I have described and illustrated in this application the preferred form of my invention, as I have found it to be the simplest, most economical, and most reliable embodiment thereof of which I am at present aware. However, I wish it understood that, so far as the broad principle of the invention is concerned, the same is not to be limited to the special embodiment shown except as may be required by certain of the following claims directed to such specific embodiment.

What I claim is:

1. In fluid-actuated devices in which hydraulic fluid is alternately withdrawn from and returned to a source of supply, a closed tank completely filled with pressure fluid, pipes for connecting said tank with the discharge side of the device to be hydraulically actuated and with the fluid pressure line to said device, means for compensating for volumetric changes in said tank comprising hollow heads mounted at longitudinally-separated points in said tank, an elastic hose secured and sealed at its opposite ends on said heads and entirely surrounded by the pressure fluid in said tank, said heads having apertures affording communication between their interiors and the interior of said hose, means for maintaining a body of compressed air within said hose, an automatic valve for releasing air from said hose in the event of a break in the fluid line, and an automatic valve for permitting entrance of pressure fluid in the tank to said hose in the event of a break in the air line.

2. In fluid-actuated devices in which hydraulic fluid is alternately withdrawn from and returned to a source of supply, a closed tank completely filled with pressure fluid, pipes for connecting said tank with the discharge side of the device to be hydraulically actuated and with the fluid pressure line to said device, a breather in said tank comprising hollow heads mounted at longitudinally-separated points in said tank, an elastic hose secured and sealed at its opposite ends on said heads and entirely surrounded by the pressure fluid in said tank, said heads having apertures affording communication between their interiors and the interior of said hose, means for maintaining a body of compressed air within said hose, an automatic valve mounted in one of said heads and opening outwardly to release air pressure in the event of a break in the oil line, and an automatic valve located in the other head and opening inwardly to permit the entrance of oil to said head in the event of a break in the air line.

3. In fluid-actuated devices in which hydraulic fluid is alternately withdrawn from and returned to a source of supply, a closed tank completely filled with pressure fluid, pipes for connecting said tank with the discharge side of the device to be hydraulically actuated and with the fluid pressure line to said device, a pipe having a closed end mounted in an opening in one end of said tank and communicating with said tank at its other end, a tube secured at one end in the opening of said tank and extending through said pipe and secured at its other end in an opening in the wall of said pipe, a pair of hollow heads secured at longitudinally separated points on said pipe, one of said heads inclosing the opening in the wall of the latter, an elastic hose secured and sealed at its opposite ends on the respective heads, both of said heads being provided with apertures affording communication between their interiors and the interior of said hose, means for continuously supplying compressed air to the interior of said hose through the first-named end of said tube, and relief valves mounted in said heads subject, respectively, to the air pressure in said hose and the oil pressure in said tank.

4. In fluid-actuated devices of the class described, a closed tank completely filled with pressure fluid, pipes for connecting said tank with the discharge side of the device to be hydraulically actuated and with the fluid pressure line to said device, a pair of hollow heads mounted at longitudinally separated points in said tank, each of said heads having an outer cylindrical portion and an inner conical portion, an elastic hose secured and sealed at its opposite ends on the cylindrical portions of said heads and entirely surrounded by the pressure fluid in said tank, the conical portions of said heads having openings affording communication between the interiors of said heads and the interior of said hose, means for maintaining a body of compressed air within said hose, an automatic valve mounted in one of said heads and opening outwardly to release air pressure in the event of a break in the oil line, and an automatic valve located in the other head and opening inwardly to permit the entrance of oil to said head in the event of a break in the air line.

5. In fluid actuating devices of the class described, a closed tank completely filled with pressure fluid, pipes for connecting said tank with the discharge side of the device to be hydraulically actuated and with the fluid pressure line to said device, a socket member secured in a central opening provided in the top of said tank and having a bore tapped at its upper end, a pipe screwed at its upper end into said socket member and beneath the latter provided with openings, said pipe extending downward in said tank and being open at its lower end, a pair of hollow heads having outer cylindrical and inner apertured conical portions, secured on said pipe, the upper head below said openings and the lower head at the bottom of said pipe, a tube located in said pipe and secured at its upper end in said bore and at its lower end in the wall of said pipe to communicate with the interior of the lower head, an elastic hose secured and sealed at its opposite ends on the cylindrical portions of said heads and entirely surrounded by the pressure fluid in said tank, an air pressure line secured in the tapped end of said bore for maintaining a body of compressed air in said hose, an automatic valve mounted in one of said heads and opening outwardly to release air pressure in the event of a break in the oil line, and an automatic valve located in the other head and opening inwardly to permit the entrance of oil to said head in the event of a break in the air line.

DOUGLAS JOHNSTON.